(12) United States Patent
Cook et al.

(10) Patent No.: US 10,073,759 B2
(45) Date of Patent: Sep. 11, 2018

(54) IDENTIFICATION AND HANDLING OF NESTED BREAKPOINTS DURING DEBUG SESSION

(71) Applicant: International Business Machines Corporation, Armonk, NY (US)

(72) Inventors: Alexander Cook, Rochester, MN (US); David M. Koster, Rochester, MN (US); Alexander J. Pogue, Rochester, MN (US); John M. Santosuosso, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 15/279,982

(22) Filed: Sep. 29, 2016

(65) Prior Publication Data
US 2018/0089061 A1 Mar. 29, 2018

(51) Int. Cl.
*G06F 9/44* (2018.01)
*G06F 11/36* (2006.01)

(52) U.S. Cl.
CPC ...... *G06F 11/3632* (2013.01); *G06F 11/3636* (2013.01)

(58) Field of Classification Search
CPC .................................. G06F 11/3632
USPC .................................. 717/123–129
See application file for complete search history.

(56) References Cited

U.S. PATENT DOCUMENTS

| | | | | |
|---|---|---|---|---|
| 5,175,856 A | * | 12/1992 | Van Dyke | G06F 8/41 711/E12.006 |
| 5,862,379 A | * | 1/1999 | Rubin | G06F 8/34 717/109 |
| 6,077,312 A | | 6/2000 | Bates et al. | |
| 6,263,489 B1 | * | 7/2001 | Olsen | G06F 11/3628 714/E11.209 |
| 6,263,491 B1 | * | 7/2001 | Hunt | G06F 9/465 714/E11.209 |
| 6,353,923 B1 | * | 3/2002 | Bogle | G06F 9/45512 714/E11.21 |
| 6,434,741 B1 | * | 8/2002 | Mirani | G06F 11/3628 714/E11.209 |

(Continued)

OTHER PUBLICATIONS

Iqbal et al, "Understanding and Developing Models for Detecting and Differentiating Breakpoints during Interactive Tasks", ACM, pp. 697-706, 2007.*

(Continued)

*Primary Examiner* — Anil Khatri
(74) *Attorney, Agent, or Firm* — Janaki K. Davda; Konrad, Raynes, Davda & Victor LLP (57) ABSTRACT

Provided are techniques for identification and handling of nested breakpoints during debug session. Program code having functions, nested breakpoints, and an indication of whether each of the breakpoints is likely to be reached is displayed, in a visualization. In response to receiving input that selects a function from the functions, a call graph is displayed for the functions in the program code to enable viewing where each of the nested breakpoints is located in the program code with reference to the functions. An option to disable a nested breakpoint of the nested breakpoints for a current execution of the program code is provided. In response to receiving input that selects the option, the nested breakpoint is disabled.

8 Claims, 10 Drawing Sheets

(56) References Cited

U.S. PATENT DOCUMENTS

| | | | |
|---|---|---|---|
| 6,530,079 B1 * | 3/2003 | Choi | G06F 8/443 712/227 |
| 6,543,049 B1 | 4/2003 | Bates et al. | |
| 6,807,583 B2 * | 10/2004 | Hrischuk | G06F 9/542 702/182 |
| 6,817,010 B2 * | 11/2004 | Aizenbud-Reshef | G06F 8/34 714/E11.181 |
| 6,922,826 B2 | 7/2005 | Bates et al. | |
| 7,080,360 B2 | 7/2006 | Bates et al. | |
| 7,203,926 B2 * | 4/2007 | Bogle | G06F 9/45512 714/E11.21 |
| 7,272,826 B2 * | 9/2007 | Bates | G06F 11/362 714/E11.207 |
| 7,464,373 B1 * | 12/2008 | Yunt | G06F 8/10 717/125 |
| 7,774,172 B1 * | 8/2010 | Yunt | G06F 8/34 703/2 |
| 7,971,189 B2 | 6/2011 | Drake | |
| 8,752,023 B2 | 6/2014 | Golan et al. | |
| 8,839,206 B2 | 9/2014 | Kalra | |
| 8,997,058 B2 * | 3/2015 | Bohnet | G06F 11/3612 717/128 |
| 9,015,676 B2 | 4/2015 | Bates et al. | |
| 9,032,374 B2 * | 5/2015 | Munson | G06F 11/3624 717/125 |
| 9,104,805 B1 | 8/2015 | Yunt et al. | |
| 9,164,871 B2 | 10/2015 | Bates et al. | |
| 9,208,058 B2 | 12/2015 | Thukkaram et al. | |
| 9,348,523 B2 * | 5/2016 | Busaba | G06F 9/467 |
| 2005/0066312 A1 | 3/2005 | Barsness et al. | |
| 2009/0138857 A1 | 5/2009 | Botzer et al. | |
| 2011/0321017 A1 | 12/2011 | Kapoor et al. | |
| 2013/0297975 A1 | 11/2013 | Kilzer et al. | |
| 2015/0052502 A1 | 2/2015 | Faillaci et al. | |
| 2015/0199260 A1 | 7/2015 | Deckert et al. | |
| 2015/0347275 A1 | 12/2015 | Garrett et al. | |

OTHER PUBLICATIONS

Yin et al, "A Pointcut Language for Setting Advanced Breakpoints", ACM, pp. 145-156, 2013.*
Koch et al, "Breakpoints and Breakpoint Detection in Source Level Emulation", IEEE, pp. 26-31, 1996.*
Mirghasemi et al, "Querypoint : Moving Backwards on Wrong Values in the Buggy Execution", ACM, pp. 1-4, 2011.*
Barton et al, "Dynamic and Graphical Web Page Breakpoints", ACM, pp. 81-90, 2010.*
Chen et al, "An Approximation Algorithm for the Minimum reakpoint Linearization Problem", IEEE/ACM Transactions on Computational Biology and Bioinformatics, vol. 6, No. 3, pp. 401-409, 2009.*
Chern et al, "Debugging with Controlflow Breakpoints", ACM, pp. 96-106, 2007.*
Ramsey, "Correctness of Trap-Based Breakpoint Implementations", ACM, pp. 15-24, 1994.*
Al-Sharif, Z.A., C.L. Jeffery, and M.H. Said, "Debugging with Dynamic Temporal Assertions", 2014 IEEE International Symposium on Software Reliability Engineering Workshops, © 2014 IEEE, Nov. 3-6, 2014, pp. 257-262, Total 6 pp.
Hinkle, B. and R.E. Johnson, "Breakpoints Revisited", Department of Computer Science University of Illinois at Urbana-Champaign, The Smalltalk Report, V5 N2, Oct. 1995, SIGS Publications on Oct. 2, 1995, Total 15 pp.
IP.com, "Method and System for Toggling Breakpoint Automatically in Debugger", IP.com No. IPCOM000201674D, Nov. 18, 2010, can be retrieved at <URL: http://ip.com/IPCOM/000201674>, Total 8 pp.
IP.com, "Method to Enable Macros Debugging", IP.com No. IPCOM000202015D, Dec. 1, 2010, can be retrieved at <URL: http://ip.com/IPCOM/000202015>, Total 7 pp.
IP.com, "Structured Enhanced Breakpoint Chain", IP.com No. IPCOM000244264D, Nov. 27, 2015, can be retrieved from the Internet at <URL: http://ip.com/IPCOM/000244264>, Total 4 pp.
Mark et al., "Unit Testing, Debugging, and Instruments", Chapter 15, More iPhone Development with Objective-C. Apress, 2015. pp. 439-466, Total 28 pp.
Mell, P. and T. Grance, "Effectively and Securely Using the Cloud Computing Paradigm", [online], Oct. 7, 2009, retrieved from the Internet at <URL: http://csrc.nist.gov/groups/SNS/cloud-computing/cloud-computing-v26.ppt>, Total 80 pp.
Mell, P. and T. Grance, "The NIST Definition of Cloud Computing (Draft)", Jan. 2011, Computer Security Division Information Technology Laboratory National Institute of Standards and Technology, Total 7 pp.
Pope, B., "Step Inside the GHCi Debugger", Mar. 6, 2008, The Monad. Reader 10, Total 19 pp.
Ramanasankaran, R., "A Framework for Recording & Replay of Software that Performs I/O", Diss. University of Kansas, 2001, Total 62 pp.
Tip, F., "Animators for Generated Programming Environments", Automated and Algorithmic Debugging. Springer Berlin Heidelberg, 1993. 241-254, Total 14 pp.
Wikipedia, "Call Graph", [online], [Retrieved on Feb. 22, 2016]. Retrieved from the Internet at <URL: https://en.wikipedia.org/wiki/Call_graph>, Last Modified on Apr. 29, 2016, Total 4 pp.
Zhang, C., D. Yan, J. Zhao, Y. Chen, and S. Yang, "BPGen: An Automated Breakpoint Generator for Debugging", ACM/IEEE 32nd International Conference on Software Engineering, vol. 2, May 2-8, 2010, pp. 271-274, ICSE '10, May 2-8, 2010, Copyright 2010 ACM, Total 4 pp.

* cited by examiner

FIG. 1

```
public void qux() {
    System.out.println("Qux!");
    for(int i=0; i<10; i++)
        foo();
        baz();
} public void foo() {
    System.out.println("Start Foo!");
    // TODO: Foo stuff
    bar();
    System.out.println("End Foo!");
} public void bar() {
    System.out.println("Start Bar!");
    // TODO: Bar stuff
    System.out.println(System.getProperty("java.class.path"));    // Breakpoint 210
    System.out.println("End Bar!");
} public void baz() {
    System.out.println("Start Baz!");
    // TODO: Baz stuff
    if(System.getProperty("java.vendor").equals("Company1"))
        bar();
}
```

IDENTIFICATION AND HANDLING OF NESTED BREAKPOINTS DURING DEBUG SESSION

FIELD

Embodiments of the invention relate to identification and handling of nested breakpoints during debug session, automatic ranking of breakpoints, and for intelligent determination of potential breakpoint usability.

BACKGROUND

Program code (a computer program or application) may be described as a set of instructions executed by a computing device. Breakpoints may be inserted into the program code. When execution of the program code reaches a breakpoint, the execution is paused to allow the state of execution (e.g., memory, registers, etc.) to be saved and/or reviewed for debugging the program code.

Stepping through program code and using breakpoints for the purposes of debugging code is common practice. When a user is manually stepping through program code (i.e., manually clicking "step by step" to execute the code step by step), it may be annoying to try to step over a function, only to get caught in a breakpoint nested in that function, or functions nested farther down.

Conventional systems have the notion of using predefined ranks to only hit breakpoints over a certain rank threshold. Some conventional systems provide ranked break points for debugging program code by running the program code until a certain instruction and choosing whether to skip breakpoints according to their predefined ranks.

SUMMARY

Provided is a method for identification and handling of nested breakpoints during debug session. The method performs operations with a processor of a computer. Program code having functions, nested breakpoints, and an indication of whether each of the breakpoints is likely to be reached is displayed, in a visualization. In response to receiving input that selects a function from the functions, a call graph is displayed for the functions in the program code to enable viewing where each of the nested breakpoints is located in the program code with reference to the functions. An option to disable a nested breakpoint of the nested breakpoints for a current execution of the program code is provided. In response to receiving input that selects the option, the nested breakpoint is disabled.

Provided is a computer program product for identification and handling of nested breakpoints during debug session. The computer program product comprises a computer readable storage medium having program code embodied therewith, the program code executable by at least one processor to perform operations. Program code having functions, nested breakpoints, and an indication of whether each of the breakpoints is likely to be reached is displayed, in a visualization. In response to receiving input that selects a function from the functions, a call graph is displayed for the functions in the program code to enable viewing where each of the nested breakpoints is located in the program code with reference to the functions. An option to disable a nested breakpoint of the nested breakpoints for a current execution of the program code is provided. In response to receiving input that selects the option, the nested breakpoint is disabled.

Provided is a computer system for identification and handling of nested breakpoints during debug session. The computer system comprises one or more processors, one or more computer-readable memories and one or more computer-readable, tangible storage devices; and program instructions, stored on at least one of the one or more computer-readable, tangible storage devices for execution by at least one of the one or more processors via at least one of the one or more memories, to perform operations. Program code having functions, nested breakpoints, and an indication of whether each of the breakpoints is likely to be reached is displayed, in a visualization. In response to receiving input that selects a function from the functions, a call graph is displayed for the functions in the program code to enable viewing where each of the nested breakpoints is located in the program code with reference to the functions. An option to disable a nested breakpoint of the nested breakpoints for a current execution of the program code is provided. In response to receiving input that selects the option, the nested breakpoint is disabled.

BRIEF DESCRIPTION OF THE SEVERAL VIEWS OF THE DRAWINGS

Referring now to the drawings in which like reference numbers represent corresponding parts throughout.

DETAILED DESCRIPTION

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Identification and Handling of Nested Breakpoints During Debug Session

Figure 1:
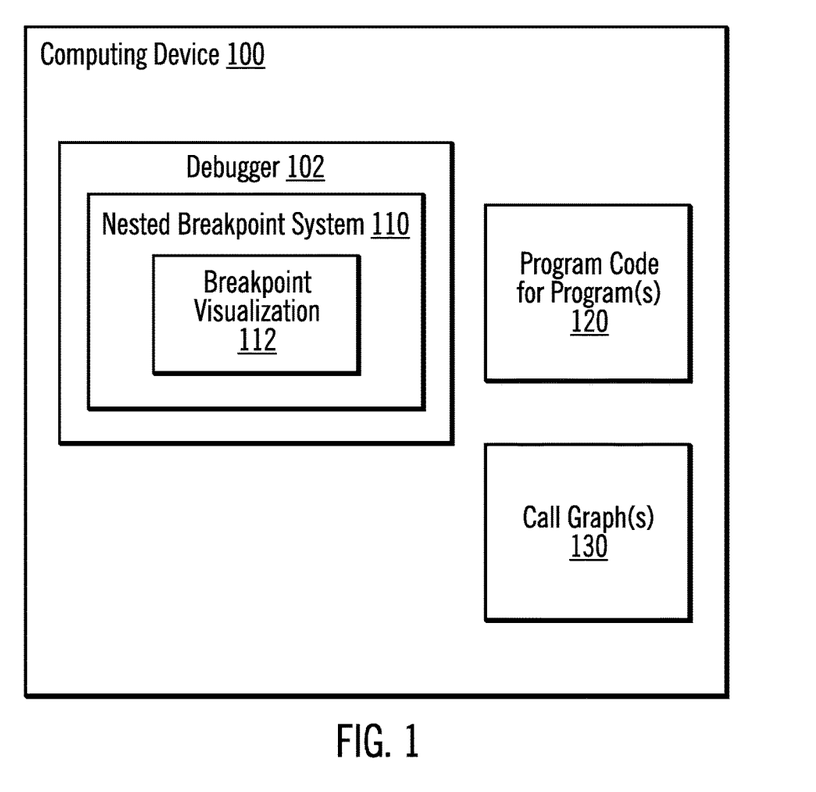
FIG. 1 illustrates, in a block diagram, a computing environment in accordance with certain embodiments.

FIG. 1 illustrates, in a block diagram, a computing environment in accordance with certain embodiments. In FIG. 1, a computing device 100 includes a debugger 102, program code for one or more programs 120, and one or more call graphs. The debugger 102 includes a nested breakpoint system 110. The nested breakpoint system 110 provides a nested breakpoint visualization 110 ("visualization"). The debugger 102 executes the program code 120 for debugging.

The nested breakpoint system 110 allows developers to determine whether functions (sometimes referred to as "methods") with nested breakpoints may be hit while stepping through program code. The nested breakpoint system 110 provides the visualization 112 in which functions with nested breakpoints that may potentially be hit may be highlighted or have an icon above them. In response to a user (e.g., a developer or a person performing debugging) hovering over a function, the nested breakpoint system 110 provides the user with the option to disable nested breakpoints for that function for the current execution. With embodiments, the option may be to select that function or an icon for that function to indicate that the breakpoint is to be disabled. With other embodiments, the option may be to select an item from a pop-up box or menu that is displayed in response to the user hovering over the function. In addition, the nested breakpoint system 110 includes the function's call graph in the visualization 112. Although call graphs may become very complex, the call graphs enable easy viewing of how functions are related.

The nested breakpoint system 110 provides the visualization 112 with the nested breakpoints that exist within a function. In addition, the nested breakpoint system 110 provides the user with the an estimate of the likelihood of reaching the breakpoints using a call graph. In certain embodiments, the nested breakpoint system 110 allows for automatic disabling of a breakpoint when the likelihood of reaching that breakpoint is over a predefined threshold. The user may set the predefined threshold. Also, allowing the user to see the call graph to reach the breakpoint gives the user an understanding of whether a breakpoint is reachable or not.

Figure 2:
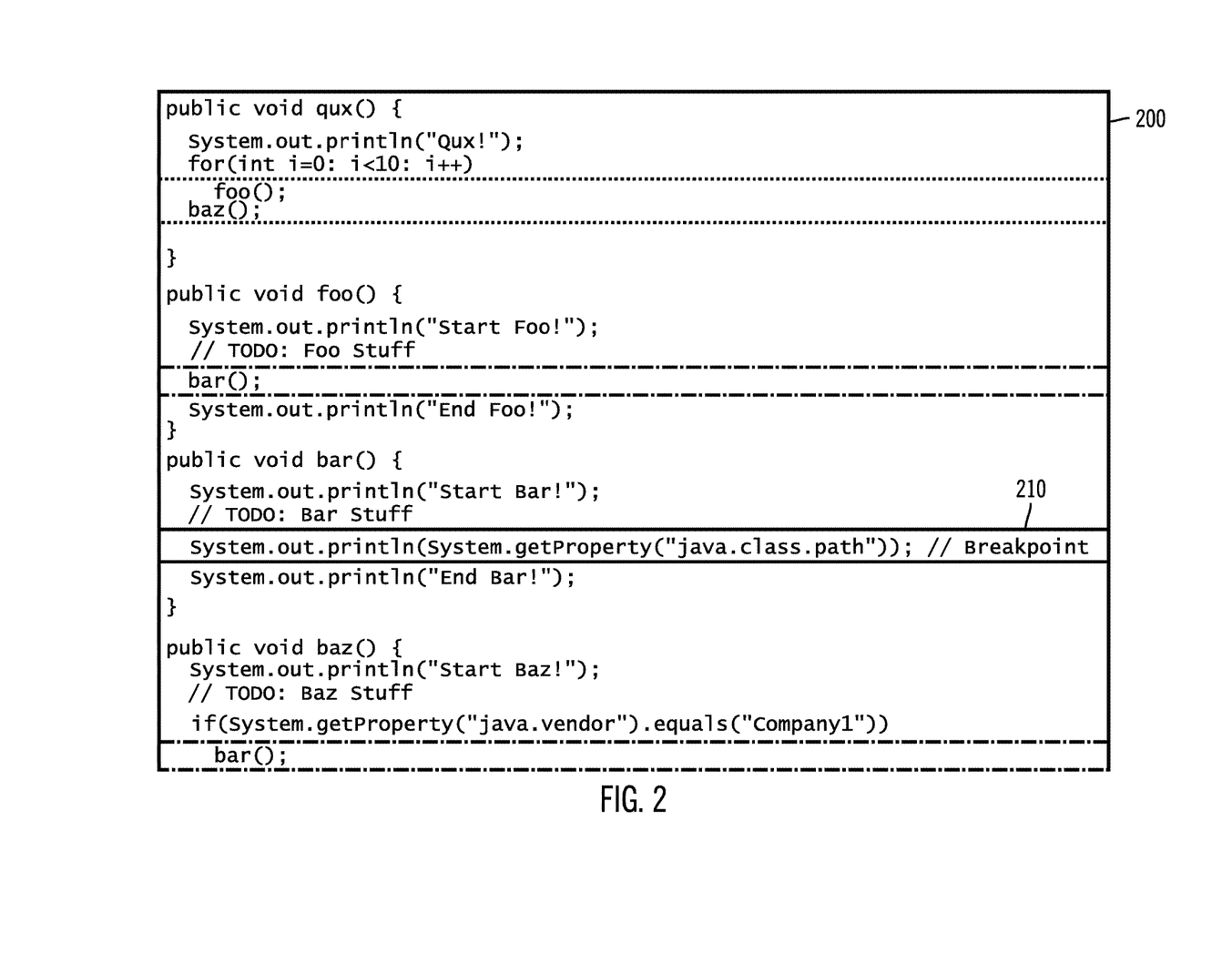
FIG. 2 illustrates an example of a program code snippet in accordance with certain embodiments.

FIG. 2 illustrates an example of a program code snippet 200 in accordance with certain embodiments. The nested breakpoint system 110 displays the visualization 112 with the program code snippet 200. In the program code snippet 200, there are functions foo( ), bar( ), and baz( ). In FIG. 2, bar( ) is a function that contains a breakpoint.

In certain embodiments, the program code snippet 200 is displayed using intensity of highlighting, different types of boxes, etc. to indicate distance from a breakpoint. For example, in FIG. 2, different boxes are used to indicate distance from a breakpoint. For example, breakpoint 210, is shown in a solid lined box. In FIG. 2, functions foo( ) and baz( ) are most distant from breakpoint 210 and are shown in a dotted box. In FIG. 2, the two instances of the functions bar( ) are a medium distance from breakpoint 210 and are shown in a dotted/dashed box.

With embodiments, if a breakpoint for a function is enabled, the user may select that function or an icon for that function to indicate that the breakpoint is to be disabled. If the breakpoint for the function is disabled, that function or icon for that function may be selected to enable the breakpoint.

In certain embodiments, disabling a breakpoint only disables that breakpoint. In certain other embodiments, the breakpoint is disabled for a specific function of interest. In other embodiments, disabling the breakpoint for a specific function of interest disables the breakpoint for all instances of that function. In certain embodiments, disabling or enabling a breakpoint results in changes to the visualization 112, such as an indication that the breakpoint has been disabled or enabled.

Figure 3:
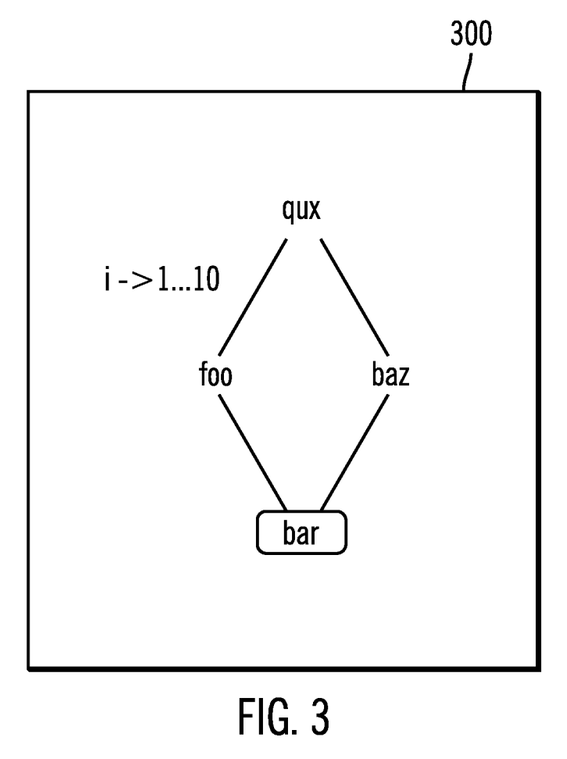
FIG. 3 illustrates an example call graph in accordance with certain embodiments.

FIG. 3 illustrates an example call graph 300 in accordance with certain embodiments. If the user hovers over a function, then the nested breakpoint system 110 displays the call graph 300. The call graph 300 illustrates how the functions foo( ), bar( ), and baz( ) are related. Bar( ) is a function that contains a breakpoint.

Figure 4:
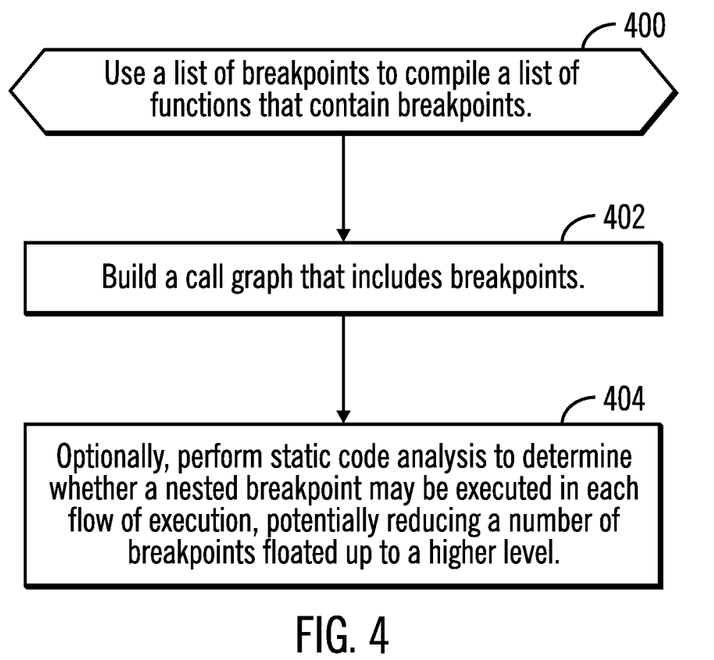
FIG. 4 illustrates, in a flow chart, operations for identifying nested breakpoints in accordance with certain embodiments.

FIG. 4 illustrates, in a flow chart, operations for identifying nested breakpoints in accordance with certain embodiments. Control begins at block 400 with the nested breakpoint system 110 using a list of breakpoints to compile a list of functions that contain breakpoints. In block 402, the nested breakpoint system 110 builds a call graph that includes breakpoints. With the operations of block 402, as the call graph is being built, the nested breakpoint system 110 compares each function in the program code with the list of functions that contain breakpoints and places breakpoint links in the call graph. With embodiments, the breakpoint links may be selected (e.g., clicked on) to display the breakpoint code. In addition, the call graph may include an icon (e.g., a checkbox icon) that lets a user disable/enable the specific breakpoint.

In block 404, the nested breakpoint system 110, optionally, performs static code analysis to determine whether a nested breakpoint may be executed in each flow of execution, potentially reducing a number of breakpoints floated up to a higher level. This means that static code analysis is run to determine whether certain paths are actually capable of being hit or not.

Figure 5:
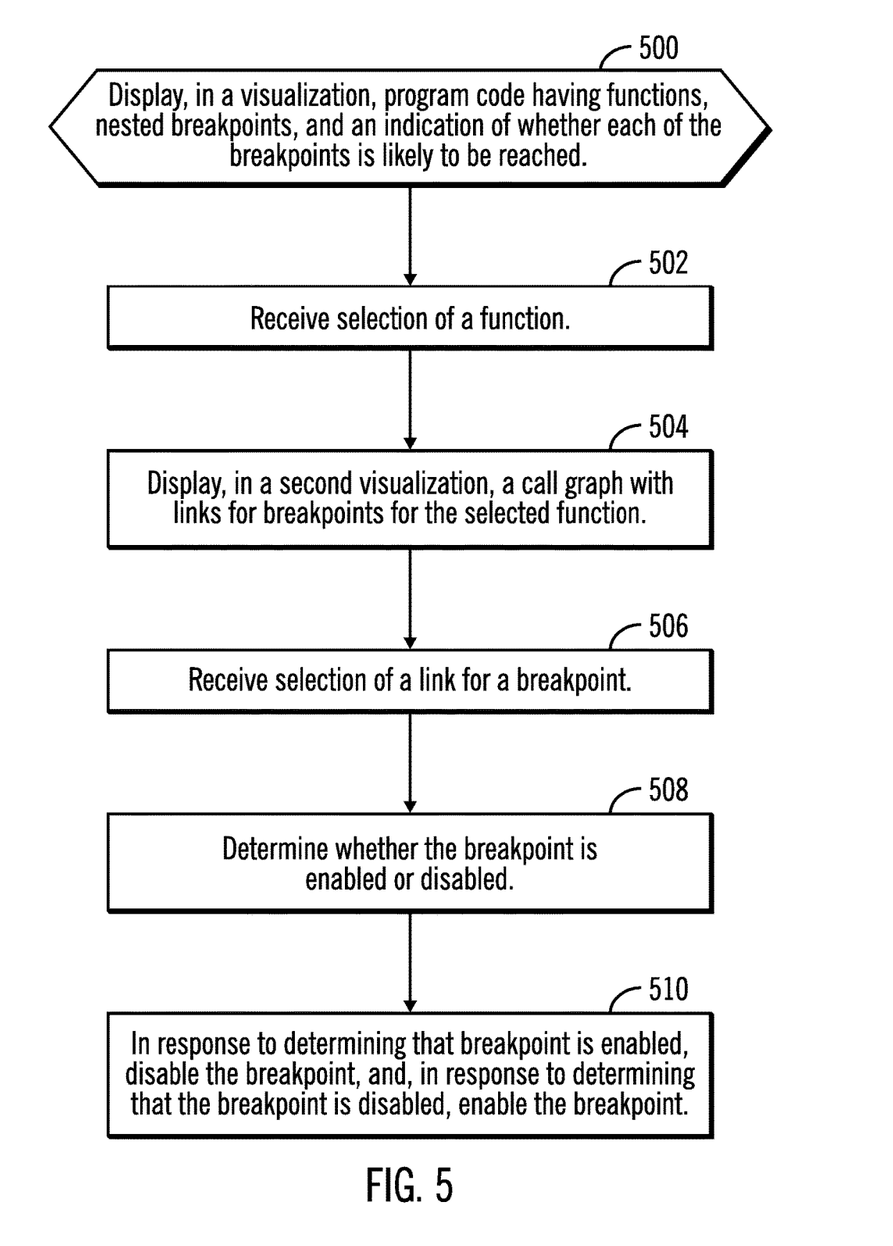
FIG. 5 illustrates, in a flow chart, operations for enabling and disabling breakpoints in accordance with certain embodiments.

FIG. 5 illustrates, in a flow chart, operations for enabling and disabling breakpoints in accordance with certain embodiments. Control begins at block 500 with the nested breakpoint system 110 displaying, in a visualization, program code having functions, nested breakpoints, and an indication of whether each of the breakpoints is likely to be reached. Embodiments indicate how deeply nested a breakpoint is. In certain embodiments, how deeply nested is a percent: Sum(depth of each function with a breakpoint)/Sum (depth of all functions). The indication may take the form of different types of boxes (around each occurrence of the function with the breakpoint) to indicate different depths or may take the form of different colors (around each occurrence of the function with the breakpoint) to indicate different depths.

In block 502, the nested breakpoint system 110 receives selection of a function. In block 504, the nested breakpoint system 110 displays, in a second visualization, a call graph with links for breakpoints for the selected function. With embodiments, the second visualization is a pop-up window that displays the call graph for a function with links to toggle breakpoints in each section of the call graph.

In block 506, the nested breakpoint system 110 receives selection of a link for a breakpoint. In block 508, the nested breakpoint system 110 determines whether the breakpoint is enabled or disabled. In block 510, the nested breakpoint system 110, in response to determining that the breakpoint is enabled, disables the breakpoint, and, in response to determining that the breakpoint is disabled, enables the breakpoint.

With embodiments, nested conditional breakpoints may be implemented at the top level of the call graph by having the nested breakpoint conditionally turned on and off based on top-level scope. With other embodiments, the nested conditional breakpoints may be implemented at a current level of execution while stepping through the program code.

With embodiments, a developer using a debugger is able to see functions where nested breakpoints may potentially be hit and toggle them on or off. Also, a developer is able to see the likelihood of reaching those breakpoints. With embodiments, this is accomplished by the nested breakpoint system 110 keeping track of historical information associated with either debugger sessions or performance profiling of the program code. Profile tools provide historic information from a debugger. It may be plausible from profile tools to see some functions are rarely invoked and are therefore less likely to get called.

With embodiments, the nested breakpoint system 110 may use a color of the function or the icon nearby to indicate how deeply nested the breakpoint is (which correlates to the chances of hitting that breakpoint). With embodiments, hovering over the function allow the user to view a call graph for the function and see where nested breakpoints are located (allowing the user to easily toggle on/off specific breakpoints).

With embodiments, the toggling on or off of breakpoints may be implemented using object oriented concepts, such as methods within a class, implementation of a given interface, methods/classes from within a certain package etc. That is, the breakpoint is disabled based on a precondition selected from a group consisting of a class, an interface, and a package.

With embodiments, conditional breakpoints are executed based on variables within their scope. The nested breakpoint system 110 has knowledge of the call graph during compilation/code composition, and during execution, the stack. This allows the nested breakpoint system 110 to create a feature such that, with reference to FIG. 3, a conditional breakpoint in function bar( ) may only be enabled if executed by function foo( ) and not if called by function baz( ).

With embodiments, the nested breakpoint system 110 may include variables that exist only in the caller's scope. For example, with reference to FIG. 3, only a break in function bar( ) if i==4 in function foo( ) The breakpoint remains entirely disabled if called by function baz( ) regardless of whether there is a variable i declared within the scope of function baz( ).

Thus, the nested breakpoint system 110 enables determining whether the user is stepping over a function with a nested breakpoint and allows for options that make for skipping over the function.

Automatic Ranking of Breakpoints for Debugging a Computer

The nested breakpoint system 110 automates the ranking of breakpoints to make debugging more efficient and user-friendly. The nested breakpoint system 110 provides automatic ranking of breakpoints based on the depth that they are nested.

Being able to skip over breakpoints based on their prior ranking may make debugging more efficient, however, going through and ranking each breakpoint may be tedious. Thus, the nested breakpoint system 110 incorporates automatic ranking of breakpoints based on one or more of the sets of rules defined below:

1. Based on a breakpoint's relative depth to a current level of execution. The user may predefine the relative depth of breakpoints that they want to hit, and all deeper breakpoints are automatically skipped. This allows a breakpoint to have multiple ranks depending on their depth relative to a specific function. For example, breakpoint X in function bar( ) may be 2 levels deep relative to function foo( ), but 4 levels deep relative to function baz( ). For a defined depth ranking of 3, the nested breakpoint system 110 ignores breakpoint X (which is 4 levels deep) in the case of function baz( ).

2. Based on object oriented constructs, such as packages, classes, abstractions, polymorphism and their hierarchy (this hierarchy may be user-defined). For example, an override function may have a higher ranking than a base function.

3. Based on historical information collected by the debugger during prior debug sessions. For example, the developer historically spending a lot of time at specific breakpoints may increase the ranking of those specific breakpoints.

With embodiments, from the current level of execution, a partial call-graph of each function is constructed to the predefined depth set by the user. At each step, only breakpoints within functions in the partial call-graph are eligible to be hit.

Figure 6:
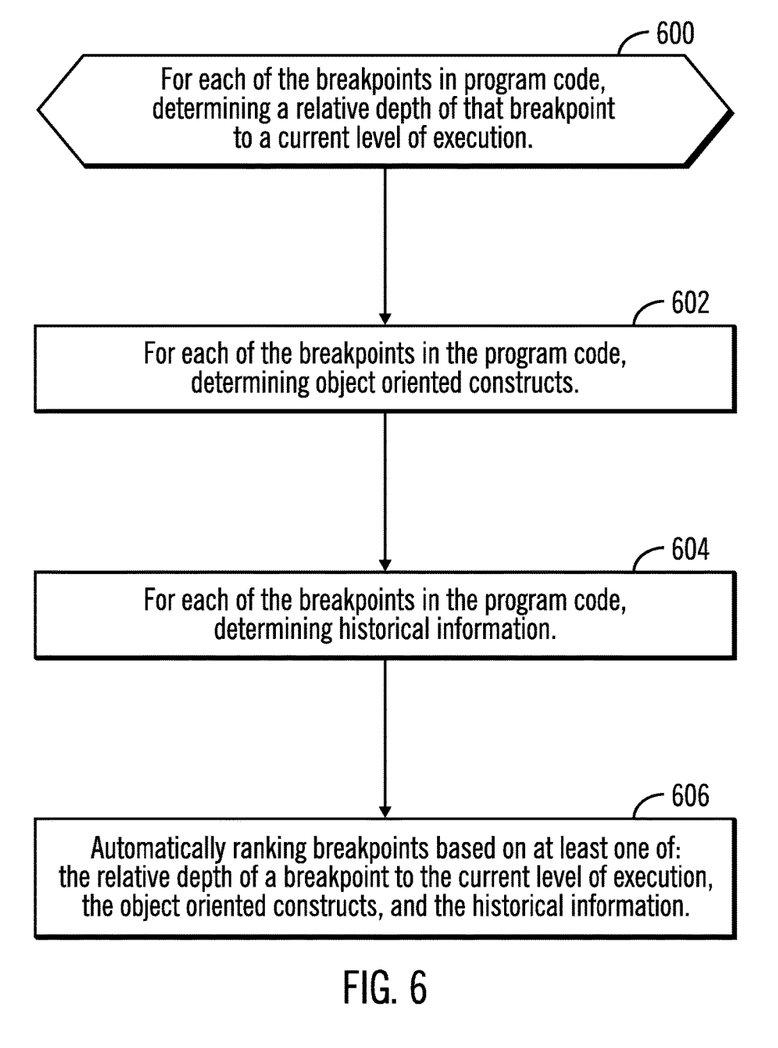
FIG. 6 illustrates, in a flow chart, operations for automatic ranking of breakpoints for debugging a computing device in accordance with certain embodiments.

FIG. 6 illustrates, in a flow chart, operations for automatic ranking of breakpoints for debugging a computing device in accordance with certain embodiments. Control begins at block 600 with the nested breakpoint system 110, for each of the breakpoints in program code, a relative depth of that breakpoint to a current level of execution. In block 602, the nested breakpoint system 110, for each of the breakpoints in the program code, determines object oriented constructs. In block 604, the nested breakpoint system 110, for each of the breakpoints in the program code, determines historical information. In block 606, the nested breakpoint system 110 automatically ranks the breakpoints based on at least one of: the relative depth of a breakpoint to a current level of execution, the object oriented constructs, and the historical information.

With embodiments, a depth of breakpoints to be hit is predefined, and breakpoints deeper than the predefined depth are skipped. The object oriented constructions may comprise packages, classes, abstractions, and polymorphism with an associated hierarchy. The historical information may be collected by a debugger during prior debug sessions.

Intelligent Determination of Potential Breakpoint Usability

When using a debugger, a user often sets many breakpoints before a problem is eventually resolved. It may take multiple debug sessions of setting multiple breakpoints to resolve programming issues. In some cases, when the user is debugging code, the user intuitively knows that, while the program code is stopped at a breakpoint, the user may move on to ("jump" to) the next breakpoint. The developer may repeat this process of trying to resolve problems, while not learning from mistakes.

Embodiments provide a debugger that learns from developer actions and gives the developer a better understanding of what breakpoints may or may not be beneficial.

Embodiments enable a debugger to learn from developer actions and advise the developer on the usefulness/validity of breakpoints.

With embodiments, the debugger keeps track of how developers interact with the debugger. The debugger keeps track of breakpoints that the developer sets, where the developer sets the breakpoints, how much information the developer examines at a breakpoint when stopped, how much time the developer spends at a breakpoint before resuming the program code, etc. Additionally the debugger stores away values of variables and the like to create a profile for each breakpoint that is stopped on.

In a streaming environment, data triggers program code execution. The incoming data and the history of that data is also captured by the debugger to increase the usefulness of the profile being built up by the debugger.

The debugger uses this information to continuously update the Integrated Development Environment (IDE) with how useful stopping at a breakpoint may be. The debugger through the IDE communicates asynchronously and indicates to the program code the usefulness of stopping at a breakpoint.

Embodiments may provide the information to the developer. Embodiments may automatically skip over breakpoints. For example, the nested breakpoint system 110 may automatically skip over breakpoints where the debugger thinks the developer will not gain useful information. Also, this may be used when using RunTo or Skip over breakpoint technology.

Figure 7:
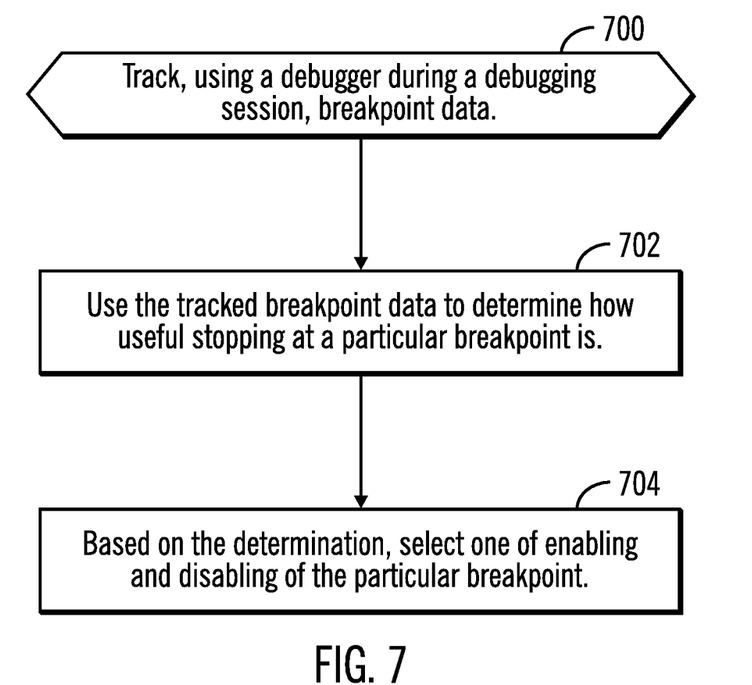
FIG. 7 illustrates, in a flow chart, operations for intelligent determination of potential breakpoint usability in accordance with certain embodiments.

FIG. 7 illustrates, in a flow chart, operations for intelligent determination of potential breakpoint usability in accordance with certain embodiments. Control begins at block 700 with tracking, using a debugger during a debugging session, breakpoint data. In block 702, the debugger uses the tracked breakpoint data to determine how useful stopping at a particular breakpoint is. In block 704, based on the determination, the debugger selects one of enabling and disabling of the particular breakpoint.

With embodiments, the breakpoint data comprises breakpoints that are set, where the breakpoints are set, how much information is examined at a breakpoint, how much time is spent at the breakpoint, and values of variables. With embodiments, in a streaming environment where data triggers program execution, incoming data and history of the incoming data is captured by the debugger.

Figure 8:
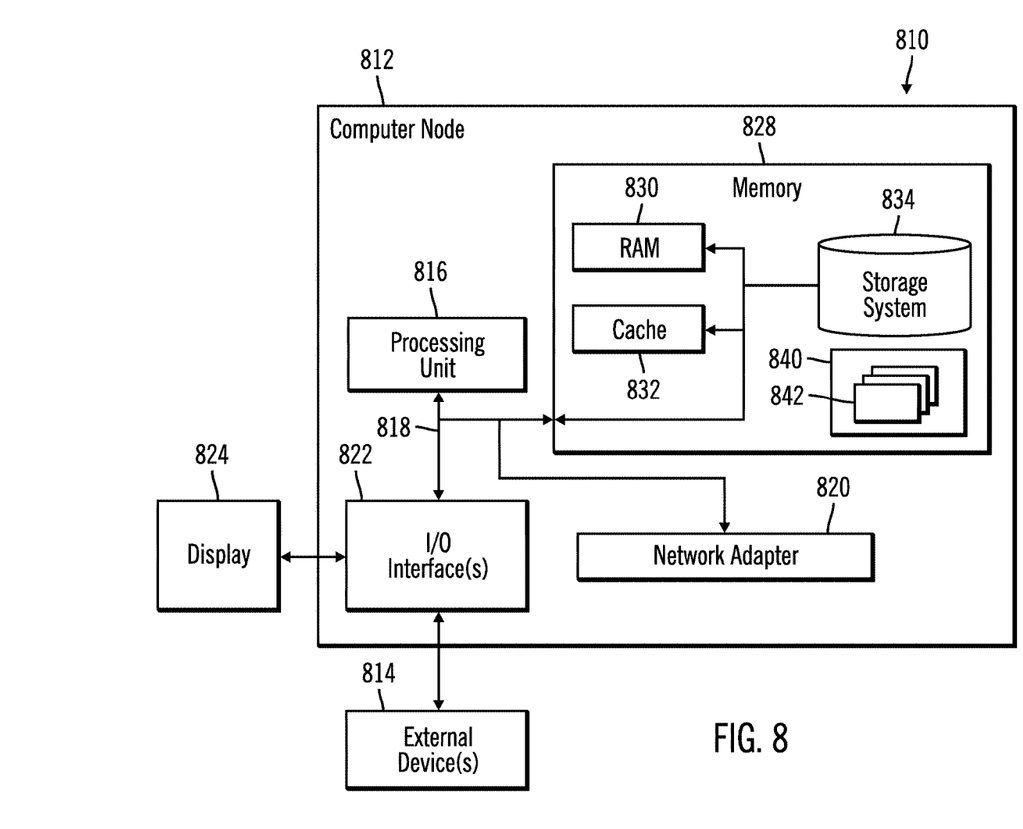
FIG. 8 illustrates a computing node in accordance with certain embodiments.

FIG. 8 illustrates a computing environment 810 in accordance with certain embodiments. In certain embodiments, the computing environment is a cloud computing environment. Referring to FIG. 8, computer node 812 is only one example of a suitable computing node and is not intended to suggest any limitation as to the scope of use or functionality of embodiments of the invention described herein. Regardless, computer node 812 is capable of being implemented and/or performing any of the functionality set forth hereinabove.

The computer node 812 may be a computer system, which is operational with numerous other general purpose or special purpose computing system environments or configurations. Examples of well-known computing systems, environments, and/or configurations that may be suitable for use with computer node 812 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer node 812 may be described in the general context of computer system executable instructions, such as program modules, being executed by a computer system. Generally, program modules may include routines, programs, objects, components, logic, data structures, and so on that perform particular tasks or implement particular abstract data types. Computer node 812 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 8, computer node 812 in cloud computing node 810 is shown in the form of a general-purpose computing device. The components of computer node 812 may include, but are not limited to, one or more processors or processing units 816, a system memory 828, and a bus 818 that couples various system components including system memory 828 to processor 816.

Bus 818 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer node 812 typically includes a variety of computer system readable media. Such media may be any available media that is accessible by computer node 812, and it includes both volatile and non-volatile media, removable and non-removable media.

System memory 828 can include computer system readable media in the form of volatile memory, such as random access memory (RAM) 830 and/or cache memory 832. Computer node 812 may further include other removable/non-removable, volatile/non-volatile computer system storage media. By way of example only, storage system 834 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 818 by one or more data media interfaces. As will be further depicted and described below, memory 828 may include at least one program product having a set (e.g., at least one) of program modules that are configured to carry out the functions of embodiments of the invention.

Program/utility 840, having a set (at least one) of program modules 842, may be stored in memory 828 by way of example, and not limitation, as well as an operating system, one or more application programs, other program modules, and program data. Each of the operating system, one or more application programs, other program modules, and program data or some combination thereof, may include an implementation of a networking environment. Program modules 842 generally carry out the functions and/or methodologies of embodiments of the invention as described herein.

Computer node 812 may also communicate with one or more external devices 814 such as a keyboard, a pointing device, a display 824, etc.; one or more devices that enable a user to interact with computer node 812; and/or any devices (e.g., network card, modem, etc.) that enable computer node 812 to communicate with one or more other computing devices. Such communication can occur via Input/Output (I/O) interfaces 822. Still yet, computer node 812 can communicate with one or more networks such as a local area network (LAN), a general wide area network (WAN), and/or a public network (e.g., the Internet) via network adapter 820. As depicted, network adapter 820 communicates with the other components of computer node 812 via bus 818. It should be understood that although not shown, other hardware and/or software components could be used in conjunction with computer node 812. Examples, include, but are not limited to: microcode, device drivers, redundant processing units, external disk drive arrays, RAID systems, tape drives, and data archival storage systems, etc.

In certain embodiments, the computing device 100 has the architecture of computer node 812. In certain embodiments, the computing device 100 is part of a cloud environment. In certain alternative embodiments, the computing device 100 is not part of a cloud environment.

Cloud Embodiments

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 9:
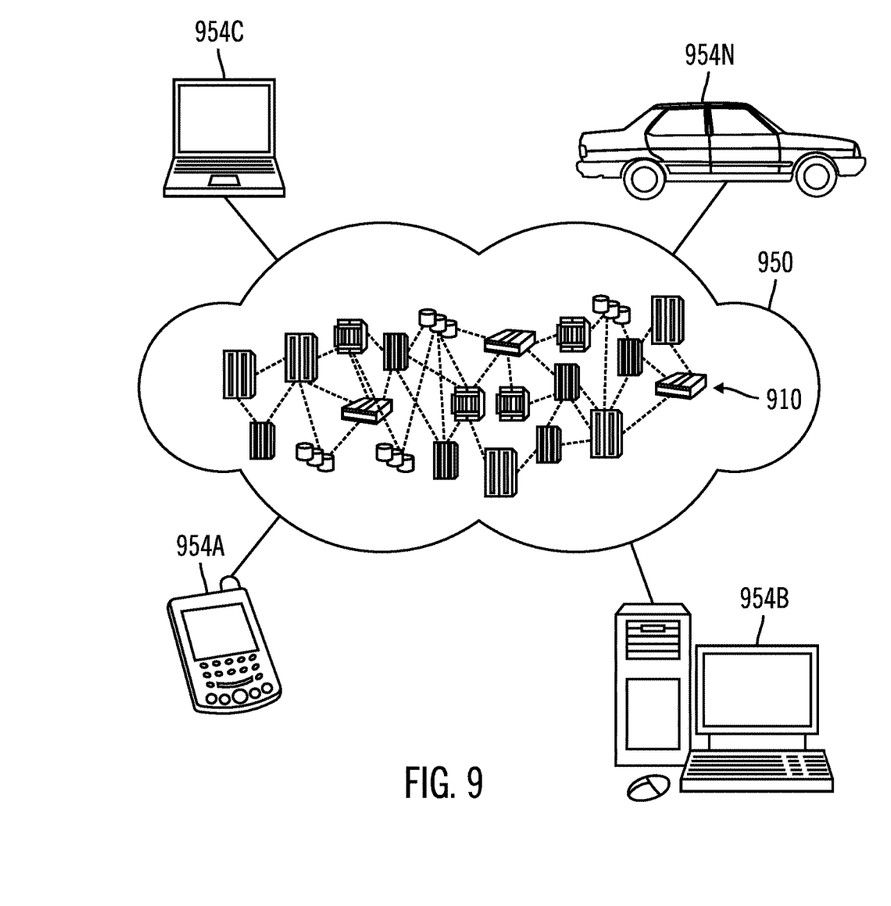
FIG. 9 illustrates a cloud computing environment in accordance with certain embodiments.

Referring now to FIG. 9, illustrative cloud computing environment 950 is depicted. As shown, cloud computing environment 950 comprises one or more cloud computing nodes 910 with which local computing devices used by cloud consumers, such as, for example, personal digital assistant (PDA) or cellular telephone 954A, desktop computer 954B, laptop computer 954C, and/or automobile computer system 954N may communicate. Nodes 910 may communicate with one another. They may be grouped (not shown) physically or virtually, in one or more networks, such as Private, Community, Public, or Hybrid clouds as described hereinabove, or a combination thereof. This allows cloud computing environment 950 to offer infrastructure, platforms and/or software as services for which a cloud consumer does not need to maintain resources on a local computing device. It is understood that the types of computing devices 954A-N shown in FIG. 9 are intended to be illustrative only and that computing nodes 910 and cloud computing environment 950 can communicate with any type of computerized device over any type of network and/or network addressable connection (e.g., using a web browser).

Figure 10:
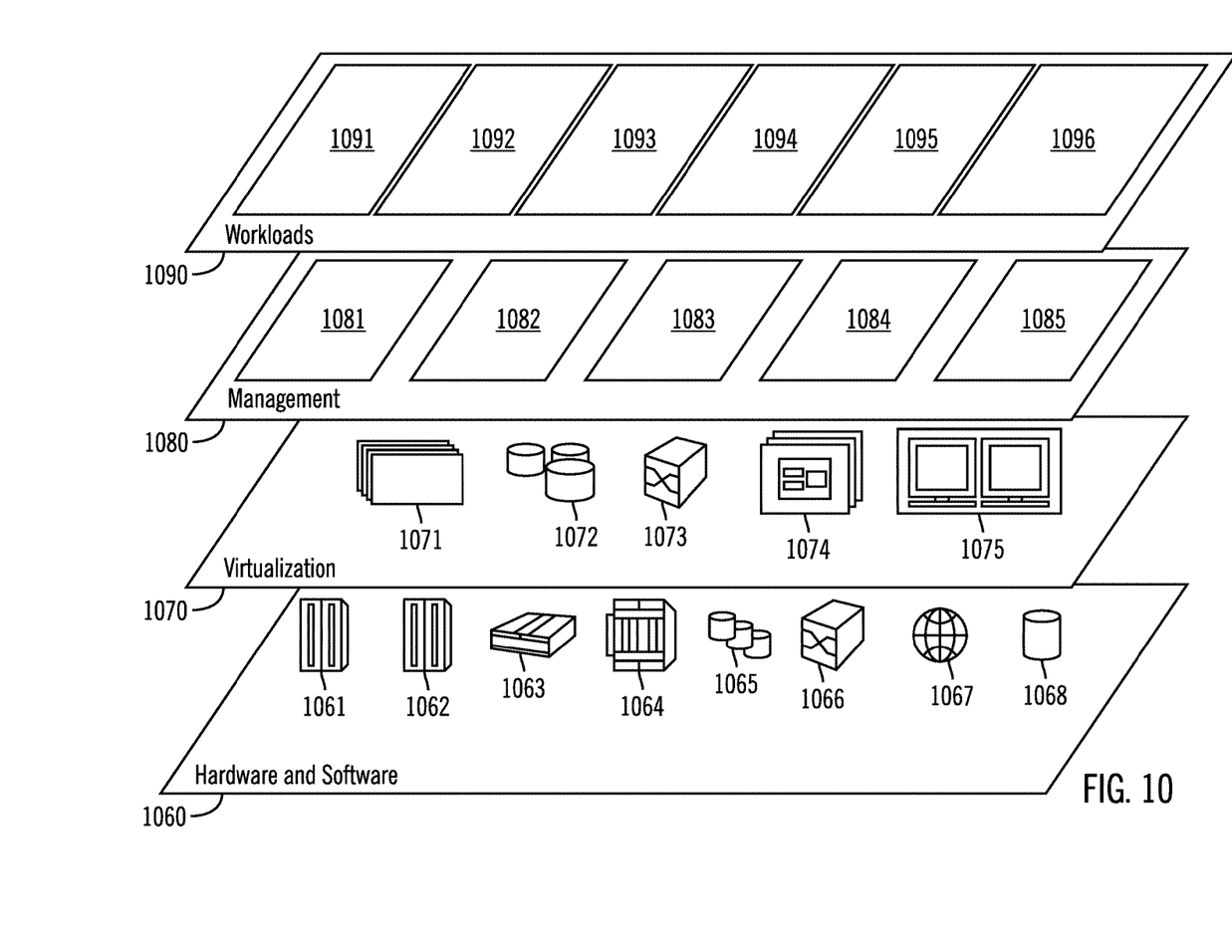
FIG. 10 illustrates abstraction model layers in accordance with certain embodiments.

Referring now to FIG. 10, a set of functional abstraction layers provided by cloud computing environment 950 (FIG. 9) is shown. It should be understood in advance that the components, layers, and functions shown in FIG. 10 are intended to be illustrative only and embodiments of the invention are not limited thereto. As depicted, the following layers and corresponding functions are provided:

Hardware and software layer 1060 includes hardware and software components. Examples of hardware components include: mainframes 1061; RISC (Reduced Instruction Set Computer) architecture based servers 1062; servers 1063; blade servers 1064; storage devices 1065; and networks and networking components 1066. In some embodiments, software components include network application server software 1067 and database software 1068.

Virtualization layer 1070 provides an abstraction layer from which the following examples of virtual entities may be provided: virtual servers 1071; virtual storage 1072; virtual networks 1073, including virtual private networks; virtual applications and operating systems 1074; and virtual clients 1075.

In one example, management layer 1080 may provide the functions described below. Resource provisioning 1081 provides dynamic procurement of computing resources and other resources that are utilized to perform tasks within the cloud computing environment. Metering and Pricing 1082 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 1083 provides access to the cloud computing environment for consumers and system administrators. Service level management 1084 provides cloud computing resource allocation and management such that required service levels are met. Service Level Agreement (SLA) planning and fulfillment 1085 provide pre-arrangement for, and procurement of, cloud computing resources for which a future requirement is anticipated in accordance with an SLA.

Workloads layer 1090 provides examples of functionality for which the cloud computing environment may be utilized. Examples of workloads and functions which may be provided from this layer include: mapping and navigation 1091; software development and lifecycle management 1092; virtual classroom education delivery 1093; data analytics processing 1094; transaction processing 1095; and breakpoint processing 1096.

Thus, in certain embodiments, software or a program, implementing breakpoint processing in accordance with embodiments described herein, is provided as a service in a cloud environment.

Additional Embodiment Details

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method, comprising:
using, with a processor of a computer, a list of nested breakpoints to compile a list of functions that contain the nested breakpoints;
displaying, in a visualization, program code having the functions, the nested breakpoints, an indication of whether each of the nested breakpoints is to be reached, and an indication of how deeply nested each of the nested breakpoints is;
in response to receiving input that selects a function from the functions in the program code in the displayed visualization,
displaying a call graph for the functions in the program code, wherein the call graph indicates how the functions are related and indicates which of the functions include the nested breakpoints; and
providing an option to disable a nested breakpoint of the nested breakpoints for a current execution of the program code; and
in response to receiving input that selects the option,
disabling the nested breakpoint; and
executing the program code with the nested breakpoint disabled.

2. The method of claim 1, further comprising:
automatically disabling the nested breakpoint based on a predefined threshold and based on based historical information associated with debugger sessions.

3. The method of claim 1, wherein the nested breakpoint is disabled based on a precondition selected from a group consisting of a class, an interface, and a package.

4. The method of claim 1, further comprising:
creating a new condition associated with a conditional breakpoint; and
enabling the conditional breakpoint based on the new condition.

5. The method of claim 1, wherein identifying a nested breakpoint further comprises:
while building the call graph, identifying any functions that include breakpoints by:
comparing each of the functions in the program code with the list of functions that contain breakpoints; and
placing an icon in the call graph for each of the nested breakpoints.

6. The method of claim 1, further comprising:
automatically ranking the nested breakpoints based on at least one of: a relative depth of a nested breakpoint to a current level of execution, object oriented constructs, and historical information.

7. The method of claim 1, further comprising:
tracking, using a debugger during a debugging session, breakpoint data;
using the tracked breakpoint data to determine how useful stopping at a particular breakpoint is; and
based on the determination, selecting one of enabling and disabling of the particular breakpoint.

8. The method of claim 1, wherein a Software as a Service (SaaS) is configured to perform method operations.

* * * * *